United States Patent Office 3,317,578
Patented May 2, 1967

3,317,578
PROCESS FOR MAKING ORGANOPOLY-
SILOXANES
Paul I. Prescott and Terry G. Selin, Schenectady, N.Y., assignors to General Electric Company, a corporation of New York
No Drawing. Filed Nov. 1, 1962, Ser. No. 234,883
10 Claims. (Cl. 260—448.2)

This invention is concerned with a process for making cyclic organopolysiloxanes. More particularly, the invention relates to a process for making cyclic organopolysiloxanes of the formula (I)
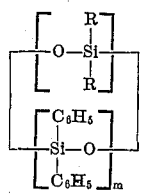

where R is a monovalent hydrocarbon radical or halogenated monovalent hydrocarbon radical, and $m$ is a whole number equal to from 2 to 3 inclusive, which process comprises reacting a preformed amine complex of a phenylsiloxanediol containing up to three diphenylsiloxy units with a diorganodihalosilane.

In the applications of Christian R. Sporck, Ser. Nos. 160,264, and now abandoned, 160,265, 160,268, and 160,269, and in the application of John F. Brown, Jr., Christian R. Sporck and Howard A. Vaughan, Jr., Ser. No. 160,266, and now abandoned, and in the application of Howard A. Vaughan, Jr., Ser. No. 160,267, and now abandoned, all these applications being filed Dec. 18, 1961, and assigned to the same assignee as the present invention, are disclosed and claimed cyclic polydiorganosiloxanes corresponding to Formula I and methods for making such compositions. Application Ser. No. 160,266 describes how these cyclic compositions can be used in the preparation of high molecular weight linear organopolysiloxane ordered polymers by condensing the cyclic polydiorganosiloxanes in the presence of an alkaline organopolysiloxane rearrangement and condensation catalyst, such as potassium hydroxide, to from materials of high mloecular weight ranging from about 10,000 to 10,000,000 or more. These high molecular weight products have been found useful in making solid cured elastic polymers (both with and without fillers) finding application as insulation for electrical conductors, and as shock mounts for apparatus subject to high physical stresses at elevated temperatures. According to the aforesaid pending applications, the cyclic polydiorganosiloxanes embraced by Formula I are prepared by reacting a phenylsiloxanediol of the formula

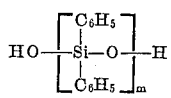

where $m$ has the meaning given above, with a diorganodihydrolyzable silane of the formula $$R_2SiX_2$$

where R is a monovalent hydrocarbon radical or halogenated aryl radicals and X is halogen, for instance, chlorine, bromine, fluorine, etc., in the presence of a hydrohalide acceptor such as pyridine, employing for the purpose large excesses of solvents in order to insure that low molecular weight cyclic polydiorganosiloxanes are obtained rather than the long chain linear polysiloxanes which would ordinarily be obtained in the absence of such of such solvents or in the presence of smaller amounts of solvent. Thereafter, it is necessary to employ a series of processing steps in order to isolate the desired cyclic polydiorganosiloxane.

The processes for making the aforesaid cyclic polydiorganosiloxanes of Formula I described in the aforesaid applications are subject to several disadvantages. In the first place, the above-described processes do not always give satisfactory yields of the cyclic polydiorganosiloxane. Furthermore, in order to avoid the formation of linear products and cyclic polydiorganosiloxanes of higher molecular weight than those embraced by Formula I, it is necessary to adjust the ratio of the organiosiloxanediol and the diorganodihydrolyzable silane as close to 1:1 as is possible, which is often a difficult control task. Finally, in order again to favor cyclization of the reactants, rather than the formation of linear polydiorganosiloxanes, it is necessary, as pointed out above, to use excessive amounts of solvent for the reactants.

Unexpectedly, we have discovered a process for making cyclic polydiorganosiloxanes of Formula I by reacting in the presence of a suitable inert solvent (the amount of which usually can be so small as to form a slurry with the reactants), (1) an amine complex of an organosiloxanediol (hereinafter referred to as the "amine complex") having the formula (II)
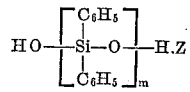

where $m$ has the value given above and Z is an organic amine consisting of carbon, hydrogen, and nitrogen, selected from the class consisting of primary, secondary and tertiary amines with (2) a diorganodihydrolyzable silane (hereinafter referred to as the "halosilane") of the formula (III) $$R_2SiX_2$$

where R is a monovalent hydrocarbon radical or a halosubstituted aryl radical and X has the meanings given above. By means of our process, we are able selectively to obtain regularly increased yields of the desired cyclic polydiorganosiloxanes over the yields realized in the processes in the aforementioned pending applications. In addition, there is no criticality as far as the addition and reaction of the two primary ingredients are concerned, namely, the amine complex and the halosilane; actually, our process can be carried out by merely adding the amine complex and the halosilane at an equal rate to each other without undue concern as to the ratio of the reactants. Finally, in contrast to the other processes described above, there is no necessity for employing excess quantities of solvent, and as a matter of fact, it is possible to use merely enough solvent to make a slurry of the reactants to effect interaction between the amine complex and the halosilane. By being able to use small amounts of solvents, it is possible to obtain the desired cyclic polydiorganosiloxane in a form which can be readily removed with a minimum of processing and purifiication.

These amine complexes of formula II selected from the class consisting of primary, secondary and tertiary amines can have a nitrogen atom as part of a ring. Among the amines which Z can be are, for instance, monomethyl amine, dimethyl amine, diethyl amine, triethyl amine, aniline, diphenyl amine, tributyl amine, pyridine, lutidine, collidine, etc.

The amine complex of Formula II may be prepared by effecting reaction between an organic amine, for which Z represents the amine moiety, and a phenylsiloxanediol such as tetraphenyldisiloxanediol-1,3 and hexaphenyltrisiloxanediol-1,5.

These amine complexes of Formula II and their preparation are disclosed and claimed in our copending application, Ser. No. 234,884, now Patent No. 3,222,369, filed concurrently herewith and assigned to the same assignee as the present invention. By reference, this application is made part of the disclosure of the instant application.

The monovalent hydrocarbon radicals and halogenated aryl radicals which R in the halosilane of the formula $R_2SiX_2$ may include are, for instance, alkyl radicals (e.g., methyl, ethyl, propyl, butyl, isobutyl, octyl, etc., radicals); cycloalkyl radicals (e.g., cyclohexyl, cycloheptyl, etc., radicals); aryl radicals (e.g., phenyl, naphthyl, biphenyl, etc., radicals); aralkyl radicals (e.g., benzyl, phenylethyl, phenylpropyl, etc., radicals); alkaryl radicals (e.g., tolyl, xylyl, ethylphenyl, etc., radicals); haloaryl radicals (e.g., chlorophenyl, 1,4-dichlorophenyl, 2,6-dibromophenyl, α-fluoronaphthyl, pentachlorophenyl, tribromobiphenyl, trifluoromethylphenyl, etc., radicals); cyanoalkyl radicals (e.g., beta-cyanoethyl, alpha-cyanoethyl, gamma-cyanopropyl, beta-cyanopropyl, etc., radicals); alkenyl, including cycloalkenyl radicals (e.g., vinyl allyl, methallyl, cyclohexenyl, cyclopentenyl cyclopentadienyl, etc., radicals); etc. Preferably, R is either the methyl, phenyl, vinyl or β-cyanoethyl radical and X is preferably chlorine. Among such halosilanes may be mentioned dimethyldichlorosilane, diethyldichlorosilane, methyl vinyldibromosilane diphenyldichlorosilane, methyl phenyldichlorosilane, methyl cyanoethyldichlorosilane, etc.

Ordinarily, it is only necessary to bring the amine complex of Formula II in contact with the halosilane employing for the purpose a minimum amount of inert solvent (that is, inert to the reactants and reaction product) sufficient to afford a liquid medium for reaction of the ingredients. The type of solvent used may be varied widely and should be one which is a liquid at room temperature (about 25° C.) and can be readily volatilized at reasonable temperatures of from about 25–200° C. Among such solvents may be mentioned aromatic hydrocarbon solvents, for instance, benzene, toluene, xylene, mesitylene, ethylbenzene, etc.; aliphatic hydrocarbons such as hexane, petroleum ethers with boiling points of from 50 to 200° C., etc.; organic ethers, such as diethyl ether, dipropyl ether, dibutyl ether, ethyl propyl ether, tetrahydrofuran, etc.; chlorinated aromatic hydrocarbon such as monochlorobenzene, monobromobenzene, etc.; chlorinated aliphatic hydrocarbon such as ethylene dichloride, amine complex.

The amount of solvent used may be varied widely and preferably one should employ only that amount of solvent required to effect the necessary action. Generally on a weight basis we may employ from about 0.1 to about 2 to 10 or more parts of a solvent per part of the total weight of the amine complex and the halosilane. Ordinarily, the reaction between the amine complex and the halosilane is exothermic and therefore requires no further heating. However, in order to insure completion of the reaction, the use of heat is not precluded so that the reaction temperature may be raised to about 50–75° C. The use of an additional quantity of an amine to insure tying up all the hydrohalide released is not precluded.

After the reaction is completed, it may be desirable to add water in an amount sufficient to dissolve the amine hydrohalide salts resulting from the reaction. The organic layer is then advantageously separated, washed again with water and the solvent, if any, present is further removed under conditions (such as at reduced pressures and temperatures) which will not affect the desired product. At this point, the solid cyclic polydiorganosiloxane obtained can be recrystallized from suitable solvents such as hexane-ethanol mixtures, etc.

Advantageously, one mole of the amine complex is caused to react with one mole of the halosilane. While the preferred molar ratio of reactants is as stated above, this ratio can vary widely within reasonable limits. Thus, one can employ the halosilane in a molar ratio of from 0.2 to 5 moles or more of the latter per mole of the amine complex.

In order that those skilled in the art may better understand how the present invention may be practiced, the following examples are given by way of illustration and not by way of limitation. All parts are by weight unless otherwise stated.

*Preparation of the pyridine complex of tetraphenyldisiloxanediol-1,3*

EXAMPLE 1

About 20.7 grams 1,1,3,3-tetraphenyldisiloxanediol-1,3 [the preparation of which is shown in an article by C. A. Burkhard, JACS, 67, pages 2173–4 (1948)] was mixed with 7.9 grams pyridine in essentially equimolar concentrations employing a solution of the phenylsiloxanediol in 100 ml. diethyl ether. Immediately after addition of the pyridine, a crystalline composition deposited and this was filtered and identified as the pyridine complex of the phenylsiloxanediol having the formula (IV)
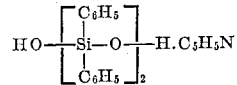

This composition had a melting point of 123–124.5° C.

*Preparation of the pyridine complex of Hexaphenyltrisiloxanediol-1,5*

EXAMPLE 2

About 10 parts 1,1,3,3,5,5-hexaphenyltrisiloxanediol-1,5 melting at 112–113° C. (the preparation of which is also described in the above Burkhard article) were dissolved in about 39 parts pyridine. Thereafter, 43 parts anhydrous toluene were added to the solution and the resulting solution was slowly poured into about 165 parts n-hexane. Well-defined crystals were formed over a period of 2 to 3 minutes after addition of the hexane. These crystals were removed and recrystallized from a small amount of a hexane-toluene solution containing these solvents in equal parts by volume. The dry crystalline product melted in the range of 80–95° C. This material was identified as the pyridine complex having the formula (V)
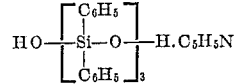

EXAMPLE 3

About 10 grams of the tetraphenyldisiloxanediol-pyridine complex prepared in Example 1 (Formula IV) was placed in a reaction vessel equipped with a stirrer and a condenser. 50 ml. of diethyl ether and 1.6 ml. pyridine were added. The stirrer was then started and 2.6 ml. dimethyldichlorosilane in 10 ml. diethyl ether was added. After stirring the mixture for 1 hour, about 50 ml. water was added and the diethyl ether layer was separated and washed with an additional amount of water. The ether layer was then evaporated on a steam bath to yield mainly a white solid which had some oil dispersed therein. The white solid crystal material comprised predominantly 1,1,3,3 - tetraphenyl-5,5-dimethyl-cyclotrisiloxane having the formula (VI)
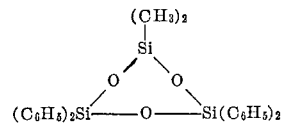

The isolation of this cyclic compound from the mixture of solid and oil was as follows. The white solid-oil mixture was extracted with methanol to remove essentially all the liquid material, leaving behind 4.5 grams of the white crystalline cyclic composition melting at 88° C. This represented a 48% conversion of the tetraphenyldisiloxanediol in the pyridine complex. If the above- identified cyclic compound had been prepared in the usual manner disclosed, for instance, in the aforesaid Sporck and Brown applications by the reaction of tetraphenyldisiloxanediol-1,3 and dimethyldichlorosilane, instead of obtaining a mixture of crystalline material with a small amount of the oil, one instead would have obtained a material which was entirely liquid and this would have required additional steps of processing, such as precipitation and purification, an effort greatly in excess of that required by means of our invention for obtaining essentially the pure cyclic derivative starting with the pyridine complex.

EXAMPLE 4

Into a reaction vessel equipped with stirrer and drying tube was charged 49.3 grams (0.1 mol) of the pyridine complex of tetraphenyldisiloxanediol-1,3 of Example 1 and 200 ml. of dry benzene. The resulting mixture was stirred while 12.7 grams (0.05 mol) diphenyldichlorosilane was added slowly over a 2-minute period. After stirring for about 4 hours, the solid material was removed by filtration and the filtrate evaporated to dryness to give 27.3 grams of hexaphenylcyclotrisiloxane, which after recrystallization from a hexane-ethanol mixture, had a melting point of about 190° C. The identification of the cyclic compound was confirmed by infrared analysis.

EXAMPLE 5

This example shows the advantage inherent in the claimed process because of the ability to use minimal amounts of solvent. More particularly, to a reaction vessel equipped with stirrer, addition funnel and drying tube was added a solution of 41.4 grams (0.1 mol) of tetraphenyldisiloxanediol-1,3 and 200 ml. dry benzene and 20 grams (0.25 mol) of dry pyridine. An immediate exothermic reaction resulted in the precipitation of a mass of the crystalline pyridine complex of the tetraphenyldisiloxanediol (Formula IV). The slurry thus obtained was stirred while 12.9 grams (0.1 mol) of dimethyldichlorosilane was added slowly over a period of 1 hour. About 200 ml. water was then added to the mixture to dissolve the pyridine hydrochloride salt. The benzene layer was isolated, washed with water, and dried over anhydrous sodium sulfate. The solvent was removed at aspirator pressure yielding 47 grams of 1,1,3,3-tetraphenyl-5,5-dimethylcyclotrisiloxane. This material was purified by being recrystallized from a 1:1 volume ratio of hexane and ethanol yielding a total of 43.1 grams of the aforesaid methyl phenyl cyclotrisiloxane having a melting point of 87–89° C. This represented a yield of 96.4% when calculated on the basis of 100% recovery of all products of reaction.

When Example 5 was repeated effecting reaction between 0.1 mol tetraphenyldisiloxanediol-1,3 and 0.1 mol dimethyldichlorosilane in the manner disclosed in the aforementioned Sporck application (Ser. No. 160,264), a large amount, specifically 700 ml. of benzene solvent (and 0.25 mol dry pyridine) and undue care in the mode of addition were required to attain a yield of 92.5% of the cyclotrisiloxane, based on 100% recovery.

EXAMPLE 6

In this example, the procedure employed in Example 4 was repeated for reaction of the pyridine complex of tetraphenyldisiloxanediol with various diorganodihydrolyzable silanes of the formula $Cl_2SiYZ$ where Y and Z have the meanings given in the following Table I, it being understood that the pyridine complex was prepared similarly as in Example 2. The molar ratio of ingredients was the same as in Example 4, with the exception that other diorganodichlorosilanes were used in place of the dimethyldichlorosilane and diphenyldichlorosilane used in Examples 3 and 4. The cyclic polydiorganosiloxanes obtained had the formula (VII)

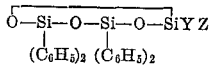

where Y and Z are the groupings found in Table I. Table I also gives the melting point of the obtained cyclic polymer as well as the percent yield of the cyclic polymer based on 100% recovery of the materials utilized.

TABLE I

| Y | Z | Melting point, ° C. | Percent Yield |
|---|---|---|---|
| $-CH_3$ | $-C_6H_5$ | 110.5–112 | 94 |
| $-C_6H_5$ | $-C_6H_5$ | 185–189 | 92.3 |
| $-CH_3$ | $-CH_2CH_2CN$ | 102–103 | 97.8 |
| $-CH_3$ | $-CH_2CH_3$ | 73–74.5 | 87.8 |
| $-CH_3$ | $-CH_2CH_2CH_3$ | 66.5–68 | 91.4 |
| $-CH_3$ | $-CH=CH_2$ | 83–85 | 83.2 |
| $-CH_3$ | $-CH_2CH=CH_2$ | 62–63 | 86.4 |

All the foregoing cyclic compositions were identified as being the desired cyclic polydiorganosiloxanes.

EXAMPLE 7

A reaction vessel equipped with stirrer was charged with 12.7 grams (0.025 mol.) of the aniline complex of tetraphenyldisiloxanediol-1,3 (prepared similarly as in Example 9 of our copending application) having the formula

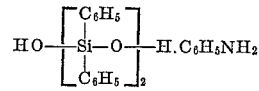

50 ml. benzene, and 2.8 grams (0.03 mol) of re-distilled aniline. While this mixture was stirred vigorously, 3.23 grams (0.025 mol) dimethyldichlorosilane was added dropwise over a period of about 15 minutes. The resulting mixture thus obtained was washed several times with water to remove the aniline hydrochloride, and the benzene solution was dried over anhydrous sodium sulfate. Removal of the benzene under reduced pressure yielded 12.1 grams of the crystalline tetraphenyldimethylcyclotrisiloxane of Formula VI, in a yield of 87 percent, having a melting point of 87–89° C. Evidence that the cyclic polysiloxane was obtained was further established by its infrared spectrum.

EXAMPLE 8

Employing the procedure in Example 7, 12.2 grams (0.025 mol) of the diethylamine complex of tetraphenyldisiloxanediol-1,3 (prepared similarly as in Example 9 of our copending application) having the formula

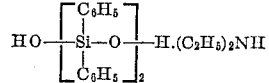

was mixed together with 50 ml. benzene and 2.2 grams diethylamine. Thereafter, 3.23 grams (0.025 mol) of dimethyldichlorosilane was added while stirring the mixture and the precipitated reaction product was crystallized from 20 ml. ethanol to yield 10.3 grams (about an 88 percent yield) of the same cyclic polysiloxane obtained in Example 7.

EXAMPLE 9

In this example, employing the same procedure as was used in Example 7, 0.45 gram dimethyldichlorosilane was added slowly over a period of ten minutes to a mixture of 2.4 grams (0.0035 mol) of the pyridine complex of hexaphenyltrisiloxanediol-1,5 having the formula

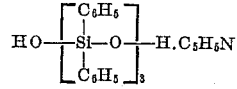

0.32 gram (0.004 mol) pyridine and 10 ml. dry benzene. The pyridine salts thus obtained were removed by washing with water, the resulting solid product was dried, the benzene solvent removed, and the solid material obtained in this manner was re-crystallized from 20 ml. ethanol to yield two grams (86 percent yield) of the desired 1,1-dimethyl - 3,3,5,5,7,7 - hexaphenylcyclotetrasiloxane (described in the aforesaid Vaughn application Ser. No. 160,267) melting at 116–117.5° C. The identity of this composition was further substantiated by infrared analysis.

It will of course be apparent to those skilled in the art that in addition to the diorganodihydrolyzable silanes employed above, other diorganodihydrolyzable silanes, many examples of which are recited above, may be used in place of those in the preceding examples without departing from the scope of the invention. Thus, employing the conditions in Examples 4 and 6, the pyridine complex of hexaphenyltrisiloxanediol-1,5 having Formula V (prepared in Example 2) is reacted with various diorganodihydrolyzable silanes, such as dimethyldichlorosilane, diphenyldichlorosilane, methylphenyldichlorosilane, diethyldichlorosilane, methylvinyldichlorosilane, divinyldichlorosilane and betacyanoethyl methyldichlorosilane, to yield cyclic polydiorganosiloxanes of the formula

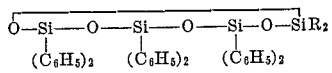

where R represents the two silicon-bonded organic groups of the aforesaid diorganodihydrolyzable silanes. In addition to varying the diorganodihydrolyzable silane, one can also vary the conditions such as the ratio of ingredients, the solvents employed, etc.

The cyclic polydiorganosiloxanes prepared in accordance with the process described in the instant application can be used to make high molecular weight organopolysiloxanes in the manner more particularly disclosed and claimed in the copending application of Brown et al., Ser. No. 160,266, filed Dec. 18, 1961, and assigned to the same assignee as the present invention. Thus, the cyclic polydiorganosiloxanes hereby obtained can be rearranged and condensed in the presence of conventional alkaline organopolysiloxane rearrangement and condensation catalysts. Among the many alkaline rearrangement and condensation catalysts which can be employed may be mentioned, for example, hydroxides of alkali metals such as sodium hydroxide, potassium hydroxide, rubidium hydroxide, and cesium hydroxide; as well as other basic materials which contain an alkali metal ion; and alkali-metal alkoxides such as lithium, potassium, sodium, rubidium, or cesium alkoxides, where the alkyl group in the alkoxide is preferably though not exclusively methyl, ethyl, propyl, isopropyl, butyl, hexyl, etc., radicals. Additional alkaline rearrangement and condensation catalysts include the quaternary phosphonium hydroxides and alkoxides of the type disclosed and claimed in U.S. Patent 2,883,366—Kantor et al.

The amount of alkaline rearrangement and condensation catalysts employed can be varied within wide limits, and generally, where the alkaline catalyst contains an alkali metal ion an amount of the alkaline catalyst is employed sufficient to provide from about 10 to 1,000 parts per weight of the alkali metal per million parts of the cyclic polydiorganosiloxane. The catalytic rearrangement and condensation of the cyclic polydiorganosiloxanes can be effected at temperatures as low as room temperature up to temperatures of the order of about 150° C. or higher. The time of rearrangement and condensation is quite rapid with the cyclic polydiorganosiloxanes, and in a matter of from 5 to 20 minutes at temperatures of from 120–130° C., the reaction is substantially completed. Additional directions as well as reactants which can be employed to make the higher molecular weight organopolysiloxanes from the cyclic polydiorganosiloxanes obtained in accordance with the practice of the present invention are more particularly disclosed and claimed in the aforesaid pending application of Brown et al., Ser. No. 160,266.

What we claim as new and desire to secure by Letters Patent of the United States is:

1. The process for selectively preparing cyclic polydiorganosiloxane of the formula

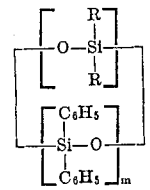

to the significant exclusion of other organopolysiloxanes, which comprises reacting an organosilane of the formula $R_2SiX_2$ with a preformed amine complex of the formula

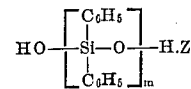

where R is a monovalent radical selected from the class consisting of monovalent hydrocarbon radicals and halogenated aryl radicals, Z is an organic amine consisting of carbon, hydrogen and nitrogen and is selected from the class consisting of primary, secondary and tertiary amines, X is a halogen, and $m$ is a whole number equal to from 2 to 3, inclusive.

2. The process as in claim 1 in which the reaction is carried out in the presence of an inert solvent.

3. The process for selectively making hexaphenylcyclotrisiloxane to the significant exclusion of other phenylpolysiloxanes which comprises effecting reaction between the preformed pyridine complex of tetraphenyldisiloxanediol-1, 3 and diphenyldichlorosilane.

4. The process for selectively preparing octaphenylcyclotetrasiloxane to the significant exclusion of other phenylpolysiloxanes which comprises effecting reaction between the preformed pyridine complex of hexaphenyltrisiloxanediol-1,3 and diphenyldichlorosilane.

5. The process for selectively 1,1,3,3-tetraphenyl-5-5-dimethylcyclotrisiloxane to the significant exclusion of other methyl phenylpolysiloxanes which comprises effecting reaction between the preformed pyridine complex of tetraphenyldisiloxanediol-1,3 with dimethyldichlorosilane.

6. The process for selectively making 1,1,3,3,5-pentaphenyl-5-methylcyclotrisiloxane to the significant exclusion of other methyl phenylpolysiloxanes which comprises effecting reaction between the performed pyridine complex of tetraphenyldisiloxanediol-1,3 and methylphenyldichlorosilane.

7. The process of selectively making 1,1,3,3-tetraphenyl-5-methyl-5-vinylcyclotetrasiloxane to the significant exclusion of other methyl vinyl phenylpolysiloxanes which comprises effecting reaction between the preformed pyridine complex of tetraphenyldisiloxanediol-1,3 and methyl vinyldichlorosilane.

8. The process for selectively making 1,1,3,3-tetraphenyl - 5 - methyl - 5 - cyanoethylcyclotrisiloxane to the significant exclusion of other methyl cyano phenylpolysiloxanes which comprises effecting reaction between the preformed pyridine complex of tetraphenyldisiloxanediol-1,3 with methyl cyanoethyldichlorosilane.

9. The process for selectively preparing 1,1,3,3-tetraphenyl-5,5-dimethylcyclotrisiloxane to the significant exclusion of other methyl phenylpolysiloxanes which comprises effecting reaction between the preformed aniline complex of tetraphenyldisiloxanediol-1,3 with dimethyldichlorosilane.

10. The process for selectively preparing 1,1,3,3-tetraphenyl-5,5-dimethylcyclotrisiloxane to the significant exclusion of other methyl phenylpolysiloxanes which comprises effecting reaction between the preformed diethyl amine complex of tetraphenyldisiloxanediol-1,3 with dimethyldichlorosilane.

References Cited by the Examiner

UNITED STATES PATENTS

| | | | |
|---|---|---|---|
| 2,684,379 | 7/1954 | Guillissen et al. | 260—448.2 |
| 2,780,636 | 2/1957 | Wright et al. | 260—448.2 |
| 2,890,234 | 6/1959 | Fletcher et al. | 260—448.2 |
| 3,037,962 | 6/1962 | Hartung et al. | 260—448.2 |

TOBIAS E. LEVOW, *Primary Examiner.*

SAMUEL H. BLECH, *Examiner.*

P. F. SHAVER, *Assistant Examiner.*